(12) United States Patent
Wang et al.

(10) Patent No.: US 9,816,002 B2
(45) Date of Patent: Nov. 14, 2017

(54) AQUEOUS COATING COMPOSITION WITH IMPROVED VISCOSITY STABILITY

(71) Applicants: Tao Wang, Highton (AU); Juan Li, Shanghai (CN); Junyu Chen, Shanghai (CN); Longlan Cui, Shanghai (CN)

(72) Inventors: Tao Wang, Highton (AU); Juan Li, Shanghai (CN); Junyu Chen, Shanghai (CN); Longlan Cui, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 51 days.

(21) Appl. No.: 14/426,835

(22) PCT Filed: Oct. 12, 2012

(86) PCT No.: PCT/CN2012/082845
§ 371 (c)(1),
(2) Date: Mar. 9, 2015

(87) PCT Pub. No.: WO2014/056184
PCT Pub. Date: Apr. 17, 2014

(65) Prior Publication Data
US 2015/0232685 A1    Aug. 20, 2015

(51) Int. Cl.
| | | |
|---|---|---|
| C09D 143/02 | (2006.01) | |
| C09D 135/00 | (2006.01) | |
| C09D 133/06 | (2006.01) | |
| C08K 9/10 | (2006.01) | |
| C08F 222/02 | (2006.01) | |
| C08F 230/02 | (2006.01) | |
| C09D 133/02 | (2006.01) | |

(52) U.S. Cl.
CPC ........ *C09D 133/064* (2013.01); *C08F 222/02* (2013.01); *C08F 230/02* (2013.01); *C08K 9/10* (2013.01); *C09D 133/02* (2013.01); *C09D 135/00* (2013.01); *C09D 143/02* (2013.01)

(58) Field of Classification Search
None
See application file for complete search history.

(56) References Cited

U.S. PATENT DOCUMENTS

| | | |
|---|---|---|
| 5,360,827 A | 11/1994 | Toda et al. |
| 5,609,965 A | 3/1997 | Esser |
| 6,492,451 B1 | 12/2002 | Dersch et al. |
| 6,756,437 B1 | 6/2004 | Xue et al. |
| 6,756,459 B2 | 6/2004 | Larson et al. |
| 6,869,996 B1 | 3/2005 | Krajnik et al. |
| 7,307,110 B2 | 12/2007 | Yatake |
| 7,357,949 B2 | 4/2008 | Trogolo et al. |
| 7,511,090 B2 | 3/2009 | Wiese et al. |
| 7,579,081 B2 | 8/2009 | Brown |
| 8,710,133 B2 | 4/2014 | Bohling et al. |
| 8,987,350 B2 | 3/2015 | Li et al. |
| 2002/0071948 A1 | 6/2002 | Duff et al. |
| 2002/0096088 A1 | 7/2002 | Bardman et al. |
| 2002/0173561 A1 | 11/2002 | Field |
| 2004/0151910 A1 | 8/2004 | Koller et al. |
| 2008/0233062 A1 | 9/2008 | Krishnan |
| 2008/0269402 A1 | 10/2008 | Maurice et al. |
| 2010/0063171 A1 | 3/2010 | Roschmann et al. |
| 2010/0256260 A1 | 10/2010 | Liu et al. |
| 2010/0298483 A1* | 11/2010 | Allen .............. B82Y 30/00 524/497 |
| 2011/0065834 A1 | 3/2011 | Ganapathiappan et al. |
| 2012/0083552 A1 | 4/2012 | Ma |
| 2012/0129965 A1 | 5/2012 | Tuchbreiter et al. |
| 2012/0142850 A1 | 6/2012 | Muhlebach et al. |
| 2015/0152282 A1 | 6/2015 | Wang et al. |

FOREIGN PATENT DOCUMENTS

| | | |
|---|---|---|
| CN | 102433054 A | 5/2012 |
| CN | 102642356 A | 8/2012 |
| CN | 102702871 A | 10/2012 |
| EP | 0022633 A2 | 1/1981 |
| EP | 0404184 A2 | 12/1990 |
| EP | 0820477 A2 | 1/1998 |
| EP | 0915108 A1 | 5/1999 |
| EP | 0959176 A1 | 11/1999 |
| EP | 1273636 A2 | 1/2003 |
| EP | 2077301 A2 | 7/2009 |
| EP | 2578647 A1 | 4/2013 |
| GB | 2111522 A | 7/1983 |
| JP | 2008105919 A | 5/2008 |
| WO | 9311181 A1 | 6/1993 |
| WO | 0068304 A1 | 11/2000 |
| WO | 2006037161 A1 | 4/2006 |
| WO | 2010074865 A1 | 7/2010 |
| WO | 2013181793 A1 | 12/2013 |

OTHER PUBLICATIONS

Li Sen, Cheng Jiang, Wen Xiu-fang, Pi Pi-hui, Yang Zhuo-ru; Progress on surface modification of polymer encapsulated nano-TiO2; (School of Chemical and Energy Engineering , South China University of Technology, Guangzhou 510640, China).

* cited by examiner

*Primary Examiner* — Richard A Huhn
(74) *Attorney, Agent, or Firm* — Karl E. Stauss; Cantor Colburn LLP

(57) ABSTRACT

This invention relates to a coating composition, especially, relates to an aqueous coating composition with improved viscosity stability.

10 Claims, No Drawings

AQUEOUS COATING COMPOSITION WITH IMPROVED VISCOSITY STABILITY

FIELD

This invention relates to a coating composition, especially, relates to an aqueous coating composition with improved viscosity stability.

BACKGROUND

Binders modified with acid-functional group from itaconic acid, phosphate acid, and phosphonate acid, etc. could provide strong interaction to the inorganic surfaces within a coating composition. These modifications provide excellent performance such as scrub, stain, and corrosion resistance to the paint.

However, these kinds of coating compositions have severe viscosity stability problems which to some extend limit their applications.

It is therefore, still desired in the technical area, a solution to balance the performance and the viscosity stability of an aqueous coating composition.

SUMMARY

The present invention provides an aqueous coating composition with a PVC of from 25% to 85% comprising: i) from 5% to 60%, by weight based on the total weight of the aqueous coating composition, an aqueous copolymer dispersion comprising, in percentage by dry weight based on the dry weight of the copolymer dispersion: of (a) 90% to 99.95% at least one ethylenically unsaturated nonionic monomer; and (b) 0.05% to 10% at least one ethylenically unsaturated phosphorus or phosphorus salts containing monomer, copolymerized itaconic acid, or the mixture thereof; and ii) from 1% to 50%, by volume based on the total volume of the aqueous coating composition, a pigment composition comprising from 50% to 100%, by dry volume based on the total dry volume of the pigment composition, a polymer encapsulated pigment.

DETAILED DESCRIPTION

For the purpose of describing the components in the compositions of the present invention, all phrases comprising parenthesis denote either or both of the included parenthetical matter and its absence. For example, the phrase "(co)polymer" includes, in the alternative, polymer, copolymer and mixtures thereof; the phrase "(meth)acrylate" means acrylate, methacrylate, and mixtures thereof.

As used herein, the term "aqueous" shall mean water or water mixed with 50 wt % or less, based on the weight of the mixture, of water-miscible solvent.

As used herein, the term "polymer" shall include resins and copolymers.

As used herein, the term "acrylic" shall mean (meth)acrylic acid, (meth)alkyl acrylate, (meth)acrylamide, (meth)acrylonitrile and modified forms thereof, such as, for example, (meth)hydroxyalkyl acrylate.

As used herein, unless otherwise indicated, the term "average particle size (or diameter)" refers to the median particle size (or diameter) of a distribution of particles as determined by electrical impedance using a MULTI-SIZER™ 3 Coulter Counter (Beckman Coulter, Inc., Fullerton, Calif.), per manufacturer's recommended procedures. The median is defined as the size wherein 50 wt % of the particles in the distribution are smaller than the median and 50 wt % of the particles in the distribution are larger than the median. This is a volume average particle size.

As used herein, unless otherwise indicated, the term "Tg" shall mean glass transition temperature measured by differential scanning calorimetry (DSC) using a heating rate of 20° C./minute and taking the inflection point in the thermogram as the Tg value. The term "calculated Tg" refers to the Tg of polymers determined via the Fox equation (T. G. Fox, Bull. Am. Physics Soc., Volume 1, Issue No. 3, page 123(1956)). The Tgs of homopolymers may be found, for example, in "Polymer Handbook", edited by J. Brandrup and E. H. Immergut, Interscience Publishers. In the case of a multi-stage polymer, the reported Tg value shall be the weighted average of the observed inflection points in the thermogram. For example, a two stage polymer consisting of 80% soft first stage and 20% hard second stage polymer having two DSC inflection points, one at −43° C. and one at 68° C., will have a reported Tg of −20.8° C.

As used herein unless otherwise indicated, the term "PVC" shall mean pigment volume concentration, which could be calculated by the equation PVC=(volume pigment+volume extender)/(volume pigment+volume binder+volume extender).

"The pigment particles", as encapsulated and/or un-encapsulated, are inorganic pigment. As used herein, unless otherwise indicated, the term "inorganic pigment" refers to a particulate inorganic material which is capable of materially contributing to the opacity or hiding capability of a coating. Such materials typically have a refractive index of equal to or greater than 1.8 and include, but not limited to, titanium dioxide ($TiO_2$), zinc oxide, zinc sulfide, barium sulfate, barium carbonate. Preferred is titanium dioxide ($TiO_2$).

"Extenders" may also be used in the coating composition of the present invention. The term "extender" refers to a particulate inorganic material having a refractive index of less than or equal to 1.8 and greater than 1.3 and includes, for example, calcium carbonate, clay, calcium sulfate, aluminosilicates, silicates, zeolites, mica, diatomaceous earth, solid or hollow glass, and ceramic beads. The aqueous coating composition may optionally contain solid or hollow polymeric particles having a Tg of greater than 60° C., such polymeric particles are classified as extenders for purposes of PVC calculations herein. The details of hollow polymeric particles are described in EP22633, EP915108, EP959176, EP404184, U.S. Pat. No. 5,360,827, WO 00/68304, and US20100063171. The solid polymeric particles have particle size from 1 to 50 microns, preferably from 5-20 microns.

The aqueous coating composition with improved viscosity stability in the present invention comprises, from 1% to 50%, preferably from 2% to 30%, most preferably from 3% to 25%, by dry volume concentration based on the total dry volume of the aqueous coating composition, a pigment composition.

The pigment composition comprises from 50% to 100%, preferably from 80% to 100%, most preferably from 95% to 100%, by dry volume based on the total dry volume of the pigment composition, polymer-encapsulated pigment particles.

Preferably, the pigment in the polymer-encapsulated pigment particles is $TiO_2$. In this preferred embodiment, $TiO_2$ in the polymer-encapsulated pigment particles has a volume percent to the total $TiO_2$ in the aqueous coating composition, of from 50% to 100%, and the volume concentration of total $TiO_2$ in the aqueous coating composition is from 2% to 30%.

The pigment composition may optionally further comprises un-encapsulated pigment particles. In an embodiment that un-encapsulated pigment particles are comprised, their amount of usage is from 0.1% to 50%, preferably from 0.1% to 20%, and most preferably from 0.1% to 5%, by dry volume based on the total dry volume of the pigment composition.

The PVCs of the aqueous coating composition in the present invention are in a range of from 25% to 85%, preferably from 45% to 85%, more preferably from 55% to 85%, and most preferably from 60% to 80%.

In some embodiments, the PVCs could be from 60% to 85%, and preferably from 65% to 80%.

In some other embodiments, the PVCs could be from 25% to 60%, preferably from 30% to 55%, and most preferably from 35% to 50%.

The aqueous coating composition of the present invention further comprises, from 5% to 80%, preferably from 10% to 75%, more preferably from 25% to 75%, even more preferably from 40% to 75%, and most preferably from 40% to 60% by dry volume concentration based on the total dry volume of the aqueous coating composition, of extenders.

The polymer shell encapsulating the polymer-encapsulated pigment comprises, at least one copolymerized ethylenically unsaturated nonionic monomer. Herein, "nonionic monomer" means that the copolymerized monomer residue does not bear an ionic charge between pH=1-14. The ethylenically unsaturated nonionic monomers used in the present invention include, for example, (meth)acrylic ester monomers, where (meth)acrylic ester designates methacrylic ester or acrylic ester, including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth) acrylonitrile; (meth)acrylamide; amino-functional and ureido-functional monomers; monomers bearing acetoacetate-functional groups; styrene and substituted styrenes; butadiene; ethylene, propylene, α-olefins such as 1-decene; vinyl acetate, vinyl butyrate, vinyl versatate and other vinyl esters; and vinyl monomers such as vinyl chloride, vinylidene chloride.

Preferably, the polymer shell of the polymer encapsulated pigment of the present invention further comprises up to 10%, preferably up to 5%, by weight based on the dry weight of the polymer shell, of an ethylenically unsaturated monomer carrying at least one functional group selected from carboxyl, carboxylic anhydride, hydroxyl, amide, sulphonate, phosphonate and mixtures thereof. Examples of these types of monomers are ethylenically unsaturated carboxylic or dicarboxylic acids, especially acrylic or methacrylic acid, itaconic acid, maleic acid, or the amides, especially N-alkylolamides or hydroxyalkyl esters of the above-mentioned carboxylic acids, such as (meth)acrylamide, N-methylol(meth)acrylamide, 2-hydroxyethyl(meth)acrylamide, hydroxyethyl(meth)acrylate, and hydroxypropyl(meth)acrylate.

The polymer shell of the polymer-encapsulated pigment may further comprises, in percentage by weight based on the dry weight of the said polymer shell, up to 5%, preferably up to 3% of a surfactant to stabilize the growing polymer-encapsulated pigments during polymerization and to discourage aggregation of the polymer-encapsulated pigments in the resulting aqueous dispersion. One or more surfactants, including anionic and nonionic surfactants, and mixtures thereof, are commonly used. Many examples of surfactants suitable for emulsion polymerization are given in McCutcheon's Detergents and Emulsifiers (MC Publishing Co. Glen Rock, NF), published annually. Other types of stabilizing agents, such as protective colloids, are optionally used.

Polymer shell of the polymer-encapsulated pigment could also be comprised of other film formable polymers, like but not limited to polyurethane, epoxy resin, alkyd resin, or polyurethane-acrylic hybrid.

Preferably, the hydrophilic monomers used in the polymer shell of the polymer-encapsulated pigment are less than 15%, based on the total amount of the polymer shell monomers.

In one embodiment of the present invention, the polymer shell of the said polymer-encapsulated pigment has an average thickness of from 10 nanometers to 200 nanometers, preferably from 30 to 150 nanometers, more preferably from 40 to 120 nanometers. SEM and TEM images can accurately measure the shell thickness.

In another embodiment of the present invention, the polymer shell of the said polymer-encapsulated pigment has a minimum film formation temperature (MFFT) of from $-35°$ C. to $60°$ C., preferably from $-20°$ C. to $40°$ C., and more preferably from $-15°$ C. to $30°$ C. The MFFT measurement is carried out by drawing down a film of the dispersion onto a metal bar subjected to a thermal gradient and then passing dry air over the dispersion until the film is dry. The MFFT is taken to be the minimum temperature where one observes a clear and crack-free film. It is not uncommon in the coatings industry to assume that a substantial extent of polymer diffusion takes place at temperatures above but not far removed from the MFFT.

Conventional free radical initiators may be included such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the same initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used. Chelating agents for the metals may optionally be used.

Chain transfer agents such as, for example, halogen compounds such as tetrabromomethane; allyl compounds; or mercaptans such as alkyl thioglycolates, alkyl mercaptoalkanoates, and C4-C22 linear or branched alkyl mercaptans may be used to lower the molecular weight of the emulsion polymer and/or to provide a different molecular weight distribution than would otherwise have been obtained with any free-radical-generating initiator(s). Chain transfer agent(s) may be added in one or more additions or continuously, linearly or not, over most or all of the entire reaction period or during limited portion(s) of the reaction period such as, for example, in the kettle charge and in the reduction of residual monomer stage. Chain transfer agents are typically used in the amount of 0 to 5 wt %, based on the total weight of monomer used to form the aqueous emulsion copolymer. A preferred level of chain transfer agent is from 0.01 to 0.5, more preferably from 0.02 to 0.4 and most preferably from 0.05 to 0.2 mole %, based on the total number of moles of monomer used to form the aqueous emulsion copolymer shell.

The polymer shell composition, particle size, particle morphology and process to make such are described, unexclusively, in for example U.S. Pat. No. 7,579,081 B2; WO2006/037161A1; WO2010/074865 A1; JP2008105919A; GB2111522A. The preparation methods of the polymer-encapsulated pigment of the coating composition of the present invention can be any methods, familiar to the technical persons in the art. General methods include emulsion polymerization, mini-emulsion polymerization, and mechanical dispersing technology, etc. Suitable examples include, but not limited to those as disclosed in U.S. Pat. No. 7,579,081 B2, U.S. Pat. No. 7,357,949 B2, and WO 2010074865 A1. Preferably, polymer-encapsulated pigments are made by emulsion polymerization as taught in U.S. Pat. No. 7,579,081 B2 and WO2006/037161A1.

The aqueous dispersion of the polymer-encapsulated pigment can further comprise functional substances, like crosslinking agent, biocide, UV absorption agent, and others. The crosslinking agent could be similar to, but not limited to, the one disclosed in U.S. Pat. No. 6,869,996 B1, the one disclosed in EP0820477, or the one disclosed in U.S. Pat. No. 5,609,965.

The existence of the polymer-encapsulated pigment is preferred to be an aqueous dispersion. It could also be powder, or other which can be dispersed in the water per paint making and keep stable. The aqueous dispersion of the polymer-encapsulated pigment can further comprise functional substances, like crosslinking agent, biocide, UV absorption agent, and others. The crosslinking agent could be similar to, but not limited to, the one disclosed in U.S. Pat. No. 6,869,996 B1, the one disclosed in EP0820477, or the one disclosed in U.S. Pat. No. 5,609,965.

The aqueous coating composition, in addition to the polymer encapsulating the polymer-encapsulated pigment, may also contain one or more additional aqueous copolymer dispersion, with an average particle diameter of from 50 to 800 nm and a minimum film formation temperature of from −35° C. to 60° C. The additional aqueous copolymer dispersion is in a content range of from 5% to 60%, preferably from 7% to 35%, most preferably from 10% to 30%, by dry weight based on the total dry weight of the coating composition.

The additional aqueous copolymer dispersion are copolymerized from 90% to 99.95%, preferably from 95% to 99.9%, most preferably, from 96% to 99.8% by dry weight based on the dry weight of copolymer, at least one ethylenically unsaturated monomer wherein the ethylenically unsaturated monomers used in the present invention include but not limited to, for example, (meth)acrylic ester monomers, where (meth)acrylic ester designates methacrylic ester or acrylic ester, including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth) acrylic acid, (meth)acrylonitrile; (meth)acrylamide; amino-functional and ureido-functional monomers; monomers bearing acetoacetate-functional groups; monomer bearing epoxy group; styrene and substituted styrenes; butadiene; ethylene, propylene, α-olefins such as 1-decene; vinyl acetate, vinyl butyrate, vinyl versatate and other vinyl esters; and vinyl monomers such as vinyl chloride, vinylidene chloride.

Said aqueous copolymer dispersion or soluble copolymer could also be epoxy polymer, poly urethane dispersion, polyurethane acrylic hybrid, alkyd polymer, hybrids or blends between those polymers. Inorganic/organic hybrids or inorganic binder like acid form or neutralized silica sol and organic modified silica sol also can be blended in the aqueous coating composition of current invention.

Said aqueous copolymer dispersion is in a form of aqueous polymer latex.

The copolymer dispersion further includes 0.05% to 10%, preferably from 0.1% to 5.0%, most preferably from 0.2% to 4% by weight based on the total dry weight of the copolymer dispersion, copolymerized ethylenically unsaturated phosphorus or phosphorus salts containing monomer, copolymerized itaconic acid, or the mixture thereof.

Optionally, the copolymer dispersion may further comprises 0.05% to 3%, preferably from 0.1% to 2% by weight based on the total dry weight of the copolymer dispersion, copolymerized polar monomer.

Suitable examples of the polar monomer as used in the present invention include, but are not limited to, (meth)acrylic acid, (meth)acrylamide, amino-functional monomers, ureido-functional monomers, and the mixture thereof.

Ethylenically unsaturated phosphorus containing monomers include, but are not limited to, phosphoalkyl (meth)acrylates such as phosphoethyl (meth)acrylate, phosphopropyl (meth)acrylate, and phosphobutyl (meth)acrylate where (meth)acrylate designates methacrylate or acrylate; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate where (meth)acrylate designates methacrylate or acrylate; phospho alkyl (meth)acrylamides such as phospho ethyl (meth)acrylamide, phospho propyl (meth)acrylamide where (meth)acrylamide designates methacrylamide or acrylamide; phosphoalkyl crotonates, phosphoalkyl maleates, phosphoalkyl fumarates, phosphodialkyl (meth)acrylates, phosphodialkyl crotonates, vinyl phosphates and (meth) allyl phosphate. Preferred is selected from phosphoalkyl (meth)acrylates or phosphoalkoxy(meth)acrylates, or the salts thereof, especially, phosphoethyl methacrylate. It is also contemplated that the copolymerized ethylenically unsaturated phosphorus containing monomer may be formed after the polymerization of at least one ethylenically unsaturated nonionic monomer and a phosphorus-capable precursor monomer. A phosphorus-capable precursor monomer is a monomer that has a reactive group that is capable, after polymerization, of reacting with a phosphorus containing compound to yield a phosphorus-containing functional group attached to the polymer. For example, a polymer containing, as a polymerized unit, hydroxyethyl methacrylate which may then be reacted, as is well known in the art, to form, for example, phosphoethyl methacrylate. Similarly, for example, a polymerized carboxylic acid unit may then be reacted, as is well known in the art, with an epoxy phosphate or an amino phosphate.

Salts of the above mentioned ethylenically unsaturated phosphorus containing monomer can also be used in the present invention.

The copolymerized ethylenically unsaturated phosphorus or phosphorus salts containing monomer, or copolymerized itaconic acid is existed in the copolymer dispersion independently or as a mixture, with or without additional polar monomers.

The glass transition temperature (Tg) of the copolymer dispersion is from −35° C. to 60° C., preferably from −15° C. to 40° C., and more preferably from −10° C. to 30° C.

The average particle diameter of the copolymer dispersion particles is from 50 to 350 nanometers, preferably from 50 to 300 nanometers, as measured by a BI-90 Particle Sizer. Without being bound by a particular theory, it is believed that lower particle sizes lead to greater copolymer dispersion shear instability and that larger particle sizes lead to lower binding capacity and therefore lower scrub resistance.

The aqueous coating composition of the present invention contains at least one conventional coatings adjuvant, including but not limited to, coalescing agents, cosolvents, surfactants, buffers, neutralizers, thickeners, non-thickening rheology modifiers, dispersants, humectants, wetting agents, midewcides, biocides, plasticizers, antifoaming agents, defoaming agents, anti-skinning agents, colorants, flowing agents, crosslinkers, anti-oxidants.

Thickeners for use herein include but not limited to polyvinyl alcohol (PVA), hydrophobically modified alkali soluble emulsions (HASE), alkali-soluble or alkali swellable emulsions (ASE), hydrophobically modified ethylene oxide-urethane polymers known in the art as HEUR, and cellulosic thickeners such as hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, 2-hydroxypropyl cellulose. Also useful as thickeners are fumed silica, attapulgite clay and other types of clay, titanate chelating agents.

Dispersants for use herein include non-ionic, anionic and cationic dispersants such as polyacid with suitable molecular weight, 2-amino-2-methyl-1-propanol (AMP), dimethyl amino ethanol (DMAE), potassium tripolyphosphate (KTPP), trisodium polyphosphate (TSPP), citric acid and other carboxylic acids. Prefer the polyacids with suitable molecular weight. The polyacids used here are such as homopolymers and copolymers based on polycarboxylic acids, including those that have been hydrophobically- or hydrophilically-modified, e.g., polyacrylic acid or polymethacrylic acid or maleic anhydride with various monomers such as styrene, acrylate or methacrylate esters, diisobutylene, and other hydrophilic or hydrophobic comonomers as well as the salts of the aforementioned dispersants, and mixtures thereof. The molecular weight of such polyacids dispersant is from 400 to 50,000, or from 400 to 30,000, prefer 500 to 10,000, more prefer 1,000 to 5,000 and most prefer 1,500 to 3,000.

Antifoaming agents and/or defoaming agents for use herein include but not limited to silicone-based and mineral oil-based defoamers. Surfactants for use herein include anionic, nonionic, cationic surfactants and amphiphilic surfactant. Prefer anionic and nonionic surfactants and more prefer nonionic surfactant.

Suitable coalescing agents, plasticizers, and other optional cosolvents include but not limited to ethylene glycol, propylene glycol, hexylene glycol, 2,2,4-trimethyl-1,3-pentanediol monoisobutyrate (TEXANOL™), Coasol™, glycol ethers, mineral spirits, methyl carbitol, butyl-carbitol, phthalates, adipates.

The aqueous coating composition formulating involves the process of selecting and admixing appropriate coating ingredients in the correct proportions to provide a paint with specific processing and handling properties, as well as a final dry paint film with the desired properties.

The aqueous coating composition may be applied by conventional application methods such as, for example, brushing, roller application, and spraying methods such as, for example, air-atomized spray, air-assisted spray, airless spray, high volume low pressure spray, and air-assisted airless spray.

Suitable substrates include, but not limited to, for example, concrete, cement board, MDF and particle board, gypsum board, wood, stone, metal, plastics, wall paper and textile, etc. preferably, all the substrate are pre-primed by waterborne or solvent borne primers.

The aqueous coating composition and its application method may influence the effectivity of this patent. When the hydrophilic substances in aqueous coating compositions are too much, then the property of the liquid stain repellency is poor. Similarly, in its application, when the concentration of hydrophilic substances on the dry paint film surface is too much, the property of the liquid stain repellency is poor.

EXAMPLES

I. Raw Materials

TABLE 1

| A) Materials used in making Polymer compound | |
|---|---|
| Compound | Chemical Nature |
| SEM | 2-sulfoethyl methacrylate |
| DMAEMA | 2-(Dimethylamino)ethyl Methacrylate |
| n-DDM | n-dodecyl mercaptan |
| AIBN | 2,2'-azobis(isobutyronitrile) |
| DS-4 | Sodium Dodecyl Benzene Sulfonate |
| t-BHP | tert-Butyl hydroperoxide |
| EDTA | Ethylene Diamine Tetraacetic Acid |
| BA | Butyl Acrylate |
| MMA | Methyl Methacrylate |
| (M)AA | (Methyl)acrylic Acid |
| SSS | Sodium Styrene sulfonate |
| St | Styrene |
| PEM | Phosphoethyl Methacrylate |
| VA | vinyl acetate |

| B) Starting materials used in paint formulation | | | |
|---|---|---|---|
| Material | Function | Chemical nature | Supplier |
| Foamaster NXZ | Defoamer | Hydrocarbons and non-ionic surfactants | Cognis Chemical (China) Co., Ltd |
| Dispelair CF-246 | Defoamer | Mineral hydrocarbons, silica and surfactants | Blackburn Chemicals |
| Ethylene Glycol | Solvent | Ethylene Glycol | Sinopharm Chemical Reagent Co., Ltd |
| Propylene Glycol | Solvent | Propylene glycol | Sinopharm Chemical Reagent Co., Ltd |
| AMP-95 | Base | 2-methyl-2-amino-propanol | Dow Chemical Company |
| Orotan™ 1288 | Pigment dispersant | Polyacid | Dow Chemical Company |
| Orotan™ 731A | Pigment dispersant | Hydrophobic copolymer | Dow Chemical Company |
| Triton™ EF-106 | Wetting agent | Nonionic surfactant | Dow Chemical Company |
| Acrysol™ DR-72 | Rheology Modifier | Hydrophobically modified polyacid | Dow Chemical Company |

TABLE 1-continued

| | | | |
|---|---|---|---|
| Natrosol 250 HBR Ammonia (28%) | Rheology Modifier Base | Hydroxyethyl Cellulose Ammonia | Ashland Aqualon Company Sinopharm Chemical Reagent Co., Ltd |
| Ti-Pure ™ R-706 | Pigment | Titanium dioxide | E. I. du Pont de Nemours and Company |
| CC-700 | Extender | Calcium carbonate | Guangfu Building Materials Group (China) |
| CC-1000 | Extender | Calcium carbonate | Guangfu Building Materials Group (China) |
| DB-80 | Extender | Calcined Clay | Guangfu Building Materials Group (China) |
| ASP-170 | Extender | Water-washed Clay | Guangfu Building Materials Group (China) |
| Texanol ™ | Coalescent | Trimethyl-pentanediol isobutyrate | Eastman Chemical Company |

II. Test Procedures

● Viscosity

The Stormer viscometer is used as an indication of low to mid shear viscosity. It is a commonly used instrument in the paint industry and gives us a common reference value when referring to recommended formulations. We measure Stormer viscosity a) just after the paint is made (initial high sheared), b) after at least 16 hours and hand stirred (equilibrated hand sheared).

● Heat Age Stability

Heat Age Stability, the ability of aqueous polymeric lattices and formulated materials to resist drastic change in viscosity, is determined observing their physical condition and properties after conditioning for ten days in a 50° C. oven.

● Stain Resistance

To test the stain performance of clear top coating, a black vinyl chart P-121-10N (Leneta) was coated by two coating composition side by side and then dry it for another 7 days in CTR. A minimum of 5 hydrophobic and 5 hydrophilic stains were used. Hydrophobic stains such as lipstick, pencil, ball point, crayon, permanent marker were applied on the sample surface across the base coating and top coating sections by pressing and moving these stains. Hydrophilic stains including red wine, coffee, black tea, green tea, and ink were applied by placing cheese clothes saturated with the corresponding stains on sample surface across the base coating and top coating sections and allowing them stay on sample surface for 2 hours. Prior to stain test, excessive liquid stains were wiped off with a paper towel or cheese cloth. The stain removal test was conducted on a modified scrub machine with a boat filled with a 3M™ commercial sponge saturated with 1% household detergent solution. 1 KG weight was placed on the boat to ensure that all the samples were tested under the same pressure. Each sample was washed for 100 cycles. Before reading, the sample charts were rinsed using regular water followed by complete drying at room temperature. Stain performance was evaluated by visual ranking following the standard described in Table 2.

TABLE 2

Ranking standard for stain performance

| Hydrophobic or hydrophilic stain resistance and removal ranking | State |
|---|---|
| 10 | No stain or trace stains left |
| 9 | 80% to 90% stain removed |
| 8 | 70% to 80% stain removed |
| 7 | 60% to 70% stain removed |
| 6 | 50% to 60% stain removed |
| 5 | 40% to 50% stain removed |
| 4 | 30% to 40% stain removed |
| 3 | 20% to 30% stain removed |
| 2 | 1% to 20% stain removed |
| 1 | Almost no stain removed |

● Washability

Draw down the paint on the panel using the 175 um film caster, starting from the secured end of the panel, and then air dry in a horizontal position for 7 days in CTR.

Soak the brush in soap water overnight before using, and mount the brush in the holder being sure that the mat is in place above the brush block and that the brush is always in the same position, then place the brush at the center of the path then carefully turn it bristle-side down when starting the test. The washability media is a 0.5% soap aqueous solution. Add more soap water into paint film if needed. Record the number of cycles to remove the paint film fully in one continuous line across the ½ inch width of the shim. Stop the abrasion tester and wipe off the area to determine the end point.

III. Experimental Examples

Example 1

Preparation of Water-Soluble Sulfur Acid Functional Polymer Solution

A 250 ml flask equipped with a magnetic stirrer, $N_2$-inlet, reflux condenser, heating mantel, and thermocouple was charged with 20 g of SEM, 4 g of DMAEMA, 10 g of BA, 16 g of MMA, 1.1 g of n-DDM, 0.5 g of AIBN, and 100 g of n-propanol. The flask was purged with $N_2$, and heated to 60° C., at which point the heating mantel was turned off and the reaction mixture was allowed to exotherm to 80° C. The heating mantel was turned back on and the reaction mixture was held at 80° C. for 3 hours. The temperature was then raised to 93° C., and 0.25 g of AIBN in 2.0 g n-propanol was added. The temperature was held at 93° C. for 1 hr; then the flask was cooled to room temperature. The product was poured into 100 ml of hexane, and then the solid polymer was collected and dried. The dried polymer was dissolved in sufficient water and $NH_3$ to make a 21.3% solution at pH 5.0.

Example 2

Formation of Opacifying Pigment Dispersion

A steel grind pot was charged with 31.7 g of the functional polymer solution (Example 1) and 95.2 g water. 450 g $TiO_2$ (TIPURE™ R-706) was added slowly while grinding at 2000 rpm using a Premier Mill Corp. Model 50 dispersator equipped with a disk blade. After addition of the $TiO_2$, the slurry was ground for 20 min; then an additional 11.3 g of water was added. The solids were 76.5%.

Example 3

Formation of Polymer Encapsulated Pigment Particles

To a 1 gallon four neck round bottom flask equipped with paddle stirrer, $N_2$-inlet condenser, heating mantel, and thermocouple was charged with 1816 g opacifying pigment dispersion (Example 2) along with a solution of 13.81 g DS-4 (23% solid) in 251.05 g DI water. The flask was purged with $N^2$, the temperature is in 30° C. Then 50 g 0.1% iron sulfate and 4 g 1% EDTA was added into reactor. Two minute later co-feed #1 consisting of 2 g t-BHP dissolved in 110.53 g DI water and co-feed #2 consisting of 8.28 g IAA dissolved in 96.25 g DI water was fed to the reactor. Two minutes after the start of the co-feed solutions, a monomer emulsion (ME1) prepared previously by mixing 56.52 g DI water, 6.9 g DS-4, and 261.67 g monomers (monomers and their ratios refer to the shell polymer composition in table 2) was fed to the reactor. When ME1 was complete, a second monomer emulsion (ME2) was prepared by mixing 269.5 g DI water, 20.71 g DS-4, and 779.5 g monomers (monomers and their ratios are the same with those in ME2 and refer to the shell polymer composition in table 2) was fed to the reactor. Upon the completion of the ME2 feed the co-feeds were continued for another 20 min until completion. The contents of the reactor were then cooled to room temperature, followed by 84 g NaOH solution (6% solid) feeding into reactor for 40 min. Small amounts of gel were filtered in a 100 mesh filter.

Example 4

Composition of Aqueous Dispersions of Polymer Encapsulated Pigment

TABLE 3

| Dispersion ID | Shell Polymer Composition | Dispersion Characteristics | | |
|---|---|---|---|---|
| | | $WS^a$ (%) | $PLT^b$ (nm) | $PVC^c$ (%) |
| 1 | 45.6 BA/53.4 MMA/1.0 MAA | 58.6% | 85 | 26.4 |
| 2 | 60 BA/19.5 MMA/19.5 St/ 1.0 MAA | 60.0% | 85 | 26.4 |
| 3 | 66 VA/34 BA | 59.9% | 85 | 26.4 |

$^a$WS = weight solids
$^b$PLT = polymer layer thickness
$^c$PVC = pigment volume concentration
The pigment encapsulated is Ti-Pure ™ R-706.

Example 5

Composition of Aqueous Copolymer Dispersions

TABLE 4

| Latex ID | Polymer Composition | Latex Characteristics | | |
|---|---|---|---|---|
| | | WS (%) | $PS^d$ (nm) | $pH^e$ |
| 1 | 54 BA/43.5 MMA/2.3 PEM/0.2 MAA | 46% | 118 | 7.7 |
| 2 | 60 BA/35.7 St/2.3 PEM/2 AA | 45% | 102 | 6.4 |
| 3 | 50 BA/48 MMA/2 IA | 48% | 128 | 7.1 |
| 4 | 45.6 BA/53.4 MMA/1.0 MAA | 50% | 120 | 8.5 |
| 5 | 60 BA/19.5 MMA/19.5 St/1.0 MAA | 47.5% | 150 | 7.8 |
| 6 | 66 VA/34 BA | 55% | 300 | 4.5 |

$^d$PS = particle size
$^e$pH = pH of the latex after neutralization

Example 6

Preparation of Aqueous Coating Compositions

Paint 1

A paint containing aqueous dispersion of polymer encapsulated pigment Dispersion 1 was prepared using the following procedure to form the aqueous coating composition 1 (paint 1). The ingredients listed in Table 5 (grind) were mixed using a high speed Cowles disperser. The ingredients listed in Table 5 (let down) were added using a conventional lab mixer. The PVC of the resulting paint is 35%.

TABLE 5

| 35% PVC Aqueous Coating Composition | |
|---|---|
| Material | Weight(g) |
| Paint 1 Formulation | |
| Water | 69.5 |
| Propylene Glycol | 20.0 |
| Orotan 1288 | 1.2 |
| Triton ™ EF-106 | 2.0 |
| Foamaster NXZ | 1.0 |
| Natrosol 250 HBR | 2.6 |
| AMP-95 | 0.2 |
| CC-700 | 153.0 |
| Letdown | |
| Dispersion 1 | 602.4 |
| Latex 1 | 123.0 |
| Texanol | 14.0 |
| Foamaster NXZ | 1.0 |
| Water | 10.1 |
| Total | 1000.0 |
| Paint characteristics | |
| PVC | 35% |
| VS | 41% |

Paint 2 (Comparative Paint)

A paint containing no dispersion of polymer encapsulated pigment was prepared using the following procedure to form the aqueous coating composition Paint 2. The ingredients listed in Table 6 (grind) were mixed using a high speed Cowles disperser. The ingredients listed in Table 6 (let down) were added using a conventional lab mixer. The PVC of the resulting paint is 35%.

TABLE 6

35% PVC Aqueous Coating Composition

| Material | Weight(g) |
|---|---|
| Paint 2 Formulation | |
| Grind | |
| Water | 147.0 |
| Propylene Glycol | 20.0 |
| Orotan 1288 | 3.0 |
| Triton ™ EF-106 | 2.0 |
| Foamaster NXZ | 1.0 |
| Natrosol 250 HBR | 2.6 |
| AMP-95 | 0.2 |
| Ti-Pure R-706 | 197.0 |
| CC-700 | 153.0 |
| Letdown | |
| Latex 1 | 123.2 |
| Latex 4 | 327.6 |
| Texanol | 14.0 |
| Foamaster NXZ | 1.0 |
| Water | 8.4 |
| Total | 1000.00 |
| Paint characteristics | |
| PVC | 35% |
| VS | 41% |

Paint 3 (Comparative Paint)

A paint containing aqueous dispersion of polymer encapsulated pigment Dispersion 1 was prepared using the following procedure to form the aqueous coating composition 3 (paint 3). The ingredients listed in Table 7 (grind) were mixed using a high speed Cowles disperser. The ingredients listed in Table 7 (let down) were added using a conventional lab mixer. The PVC of the resulting paint is 35%.

TABLE 7

35% PVC Aqueous Coating Composition

| Material | Weight(g) |
|---|---|
| Paint 3 Formulation | |
| Water | 80.0 |
| Propylene Glycol | 20.0 |
| Orotan 1288 | 1.2 |
| Triton ™ EF-106 | 2.0 |
| Foamaster NXZ | 1.0 |
| Natrosol 250 HBR | 2.6 |
| AMP-95 | 0.2 |
| CC-700 | 153 |
| Letdown | |
| Dispersion 1 | 602.4 |
| Latex 4 | 113.4 |
| Texanol | 14.0 |
| Foamaster NXZ | 1.0 |
| Water | 9.2 |
| Total | 1000.00 |
| Paint characteristics | |
| PVC | 35% |
| VS | 41% |

Paint 4 (Comparative Paint)

A paint containing no dispersion of polymer encapsulated pigment was prepared using the following procedure to form the aqueous coating composition Paint 4. The ingredients listed in Table 8 (grind) were mixed using a high speed Cowles disperser. The ingredients listed in Table 8 (let down) were added using a conventional lab mixer. The PVC of the resulting paint is 35%.

TABLE 8

35% PVC Aqueous Coating Composition

| Material | Weight(g) |
|---|---|
| Paint 4 Formulation | |
| Grind | |
| Water | 147.0 |
| Propylene Glycol | 20.0 |
| Orotan 1288 | 3.0 |
| Triton ™ EF-106 | 2.0 |
| Foamaster NXZ | 1.0 |
| Natrosol 250 HBR | 2.6 |
| AMP-95 | 0.2 |
| Ti-Pure R-706 | 197.0 |
| CC-700 | 153.0 |
| Letdown | |
| Latex 4 | 440.9 |
| Texanol | 14.0 |
| Foamaster NXZ | 1.0 |
| Water | 18.3 |
| Total | 1000.00 |
| Paint characteristics | |
| PVC | 35% |
| VS | 41% |

Paint 5

A paint containing aqueous dispersion of polymer-encapsulated pigment Dispersion 2 was prepared using the following procedure to form the aqueous coating composition Paint 5. The ingredients listed in Table 9 (grind) were mixed using a high speed Cowles disperser. The ingredients listed in Table 9 (let down) were added using a conventional lab mixer. The PVC of the resulting paint is 35%.

TABLE 9

35% PVC Aqueous Coating Composition

| Material | Weight(g) |
|---|---|
| Paint 5 Formulation | |
| Water | 70.0 |
| Propylene Glycol | 20.0 |
| Orotan 1288 | 1.2 |
| Triton ™ EF-106 | 2.0 |
| Foamaster NXZ | 1.0 |
| Natrosol 250 HBR | 2.6 |
| AMP-95 | 0.2 |
| CC-700 | 153.0 |
| Letdown | |
| Dispersion 2 | 592.5 |
| Latex 2 | 128.5 |
| Texanol | 14.0 |
| Foamaster NXZ | 1.0 |
| Water | 14.0 |
| Total | 1000.00 |
| Paint characteristics | |
| PVC | 35% |
| VS | 41% |

Paint 6 (Comparative Paint)

A paint containing no polymer-encapsulated pigment was prepared using the following procedure to form the aqueous coating composition Paint 6. The ingredients listed in Table 10 (grind) were mixed using a high speed Cowles disperser. The ingredients listed in Table 10 (let down) were added using a conventional lab mixer. The PVC of the resulting paint is 35%.

TABLE 10

35% PVC Aqueous Coating Composition

| Material | Weight(g) |
|---|---|
| Paint 6 Formulation | |
| Grind | |
| Water | 138.0 |
| Propylene Glycol | 20.0 |
| Orotan 1288 | 3.0 |
| Triton ™ EF-106 | 2.0 |
| Foamaster NXZ | 1.0 |
| Natrosol 250 HBR | 2.6 |
| AMP-95 | 0.2 |
| Ti-Pure R-706 | 197.0 |
| CC-700 | 153.0 |
| Letdown | |
| Latex 2 | 128.5 |
| Latex 5 | 334.5 |
| Texanol | 14.0 |
| Foamaster NXZ | 1.0 |
| Water | 5.2 |
| Total | 1000.00 |
| Paint characteristics | |
| PVC | 35% |
| VS | 41% |

Paint 7

A paint containing aqueous dispersion of polymer-encapsulated pigment Dispersion 1 was prepared using the following procedure to form the aqueous coating composition Paint 7. The ingredients listed in Table 11 (grind) were mixed using a high speed Cowles disperser. The ingredients listed in Table 11 (let down) were added using a conventional lab mixer. The PVC of the resulting paint is 75%.

TABLE 11

75% PVC Aqueous Coating Composition

| Material | Weight(g) |
|---|---|
| Paint 7 Formulation | |
| Water | 344.5 |
| Ethylene Glycol | 6.0 |
| Orotan 1288 | 3.9 |
| Triton CF-10 | 1.0 |
| Dispelair CF-246 | 1.0 |
| Natrosol 250 HBR | 5.0 |
| AMP-95 | 0.5 |
| CC-700 | 156.0 |
| CC-1000 | 112.0 |
| ASP 170 | 97.0 |
| DB-80 | 58.5 |
| Letdown | |
| Dispersion 1 | 116.8 |
| Latex 1 | 72.5 |

TABLE 11-continued

75% PVC Aqueous Coating Composition

| Material | Weight(g) |
|---|---|
| Texanol | 6.3 |
| Dispelair CF-246 | 0.3 |
| Water | 18.7 |
| Total | 1000.00 |
| Paint characteristics | |
| PVC | 75% |
| VS | 32% |

Paint 8 (Comparative Paint)

A paint containing no polymer-encapsulated pigment was prepared using the following procedure to form the aqueous coating composition Paint 8. The ingredients listed in Table 12 (grind) were mixed using a high speed Cowles disperser. The ingredients listed in Table 12 (let down) were added using a conventional lab mixer. The PVC of the resulting paint is 75%.

TABLE 12

75% PVC Aqueous Coating Composition

| Material | Weight(g) |
|---|---|
| Paint 8 Formulation | |
| Grind | |
| Water | 366.5 |
| Ethylene Glycol | 6.0 |
| Orotan 1288 | 3.9 |
| Triton CF-10 | 1.0 |
| Dispelair CF-246 | 1.0 |
| Natrosol 250 HBR | 5.0 |
| AMP-95 | 0.5 |
| Ti-Pure R-706 | 38.5 |
| CC-700 | 156.0 |
| CC-1000 | 112.0 |
| ASP 170 | 97.0 |
| DB-80 | 58.5 |
| Letdown | |
| Latex 1 | 72.5 |
| Latex 4 | 50.2 |
| Texanol | 6.3 |
| Dispelair CF-246 | 0.3 |
| Water | 24.8 |
| Total | 1000.00 |
| Paint characteristics | |
| PVC | 75% |
| VS | 32% |

Paint 9

A paint containing aqueous dispersion of polymer-encapsulated pigment Dispersion 1 was prepared using the following procedure to form the aqueous coating composition Paint 9. The ingredients listed in Table 13 (grind) were mixed using a high speed Cowles disperser. The ingredients listed in Table 13 (let down) were added using a conventional lab mixer. The PVC of the resulting paint is 75%.

TABLE 13

75% PVC Aqueous Coating Composition

| Material | Weight(g) |
|---|---|
| Paint 9 Formulation | |
| Water | 344.5 |
| Ethylene Glycol | 6.0 |
| Orotan 1288 | 3.9 |
| Triton CF-10 | 1.0 |
| Dispelair CF-246 | 1.0 |
| Natrosol 250 HBR | 5.0 |
| AMP-95 | 0.5 |
| CC-700 | 156.0 |
| CC-1000 | 112.0 |
| ASP 170 | 97.0 |
| DB-80 | 58.5 |
| Letdown | |
| Dispersion 1 | 116.8 |
| Latex 4 | 66.7 |
| Texanol | 6.3 |
| Dispelair CF-246 | 0.3 |
| Water | 24.5 |
| Total | 1000.00 |
| Paint characteristics | |
| PVC | 75% |
| VS | 32% |

Paint 10 (Comparative Paint)

A paint containing no polymer-encapsulated pigment was prepared using the following procedure to form the aqueous coating composition Paint 10. The ingredients listed in Table 14 (grind) were mixed using a high speed Cowles disperser. The ingredients listed in Table 14 (let down) were added using a conventional lab mixer. The PVC of the resulting paint is 75%.

TABLE 14

75% PVC Aqueous Coating Composition

| Material | Weight(g) |
|---|---|
| Paint 10 Formulation | |
| Grind | |
| Water | 364.5 |
| Ethylene Glycol | 6.0 |
| Orotan 1288 | 3.9 |
| Triton CF-10 | 1.0 |
| Dispelair CF-246 | 1.0 |
| Natrosol 250 HBR | 5.0 |
| AMP-95 | 0.5 |
| Ti-Pure R-706 | 38.5 |
| CC-700 | 156.0 |
| CC-1000 | 112.0 |
| ASP 170 | 97.0 |
| DB-80 | 58.5 |
| Letdown | |
| Latex 4 | 116.9 |
| Texanol | 6.3 |
| Dispelair CF-246 | 0.3 |
| Water | 32.6 |
| Total | 1000.00 |
| Paint characteristics | |
| PVC | 75% |
| VS | 32% |

Paint 11 (Comparative Paint)

A paint containing no polymer-encapsulated pigment and no TiO$_2$ was prepared using the following procedure to form the aqueous coating composition Paint 11. The ingredients listed in Table 15 (grind) were mixed using a high speed Cowles disperser. The ingredients listed in Table 15 (let down) were added using a conventional lab mixer. The PVC of the resulting paint is 75%.

TABLE 15

75% PVC Aqueous Coating Composition

| Material | Weight(g) |
|---|---|
| Paint 11 Formulation | |
| Grind | |
| Water | 354.5 |
| Ethylene Glycol | 6.0 |
| Orotan 1288 | 3.9 |
| Triton CF-10 | 1.0 |
| Dispelair CF-246 | 1.0 |
| Natrosol 250 HBR | 5.0 |
| AMP-95 | 0.5 |
| CC-700 | 156.0 |
| CC-1000 | 112.0 |
| ASP 170 | 124.0 |
| DB-80 | 58.5 |
| Letdown | |
| Latex 1 | 72.5 |
| Latex 4 | 50.0 |
| Texanol | 6.3 |
| Dispelair CF-246 | 0.3 |
| Water | 48.5 |
| Total | 1000.00 |
| Paint characteristics | |
| PVC | 75% |
| VS | 32% |

Paint 12

A paint containing aqueous dispersion of polymer-encapsulated pigment Dispersion 3 was prepared using the following procedure to form the aqueous coating composition Paint 12. The ingredients listed in Table 16 (grind) were mixed using a high speed Cowles disperser. The ingredients listed in Table 16 (let down) were added using a conventional lab mixer. The PVC of the resulting paint is 75%.

TABLE 16

75% PVC Aqueous Coating Composition

| Material | Weight(g) |
|---|---|
| Paint 12 Formulation | |
| Water | 344.5 |
| Ethylene Glycol | 6.0 |
| Orotan 1288 | 3.9 |
| Triton CF-10 | 1.0 |
| Dispelair CF-246 | 1.0 |
| Natrosol 250 HBR | 5.0 |
| AMP-95 | 0.5 |
| CC-700 | 156.0 |
| CC-1000 | 112.0 |
| ASP 170 | 97.0 |
| DB-80 | 58.5 |
| Letdown | |
| Dispersion 3 | 116.8 |
| Latex 3 | 71.5 |
| Texanol | 6.3 |

TABLE 16-continued

75% PVC Aqueous Coating Composition

| Material | Weight(g) |
| --- | --- |
| Dispelair CF-246 | 0.3 |
| Water | 19.7 |
| Total | 1000.00 |
| Paint characteristics | |
| PVC | 75% |
| VS | 32% |

Paint 13 (Comparative Paint)

A paint containing no polymer-encapsulated pigment was prepared using the following procedure to form the aqueous coating composition Paint 13. The ingredients listed in Table 17 (grind) were mixed using a high speed Cowles disperser. The ingredients listed in Table 17 (let down) were added using a conventional lab mixer. The PVC of the resulting paint is 75%.

TABLE 17

75% PVC Aqueous Coating Composition

| Material | Weight(g) |
| --- | --- |
| Paint 13 Formulation | |
| Grind | |
| Water | 368.0 |
| Ethylene Glycol | 6.0 |
| Orotan 1288 | 3.9 |
| Triton CF-10 | 1.0 |
| Dispelair CF-246 | 1.0 |
| Natrosol 250 HBR | 5.0 |
| AMP-95 | 0.5 |
| Ti-Pure R-706 | 38.5 |
| CC-700 | 156.0 |
| CC-1000 | 112.0 |
| ASP 170 | 97.0 |
| DB-80 | 58.5 |
| Letdown | |
| Latex 3 | 71.5 |
| Latex 6 | 40.6 |
| Texanol | 6.3 |
| Dispelair CF-246 | 0.3 |
| Water | 33.9 |
| Total | 1000.00 |
| Paint characteristics | |
| PVC | 75% |
| VS | 32% |

Paint 14

A paint containing aqueous dispersion of polymer-encapsulated pigment Dispersion 3 was prepared using the following procedure to form the aqueous coating composition Paint 14. The ingredients listed in Table 18 (grind) were mixed using a high speed Cowles disperser. The ingredients listed in Table 18 (let down) were added using a conventional lab mixer. The PVC of the resulting paint is 75%.

TABLE 18

75% PVC Aqueous Coating Composition

| Material | Weight(g) |
| --- | --- |
| Paint 14 Formulation | |
| Water | 344.5 |
| Ethylene Glycol | 6.0 |
| Orotan 1288 | 3.9 |
| Triton CF-10 | 1.0 |
| Dispelair CF-246 | 1.0 |
| Natrosol 250 HBR | 5.0 |
| AMP-95 | 0.5 |
| CC-700 | 156.0 |
| CC-1000 | 112.0 |
| ASP 170 | 97.0 |
| DB-80 | 58.5 |
| Letdown | |
| Dispersion 3 | 116.8 |
| Latex 2 | 76.3 |
| Texanol | 6.3 |
| Dispelair CF-246 | 0.3 |
| Water | 20.9 |
| Total | 1000.00 |
| Paint characteristics | |
| PVC | 75% |
| VS | 32% |

Paint 15 (Comparative Paint)

A paint containing no polymer-encapsulated pigment was prepared using the following procedure to form the aqueous coating composition Paint 15. The ingredients listed in Table 19 (grind) were mixed using a high speed Cowles disperser. The ingredients listed in Table 19 (let down) were added using a conventional lab mixer. The PVC of the resulting paint is 75%.

TABLE 19

75% PVC Aqueous Coating Composition

| Material | Weight(g) |
| --- | --- |
| Paint 15 Formulation | |
| Grind | |
| Water | 371.1 |
| Ethylene Glycol | 6.0 |
| Orotan 1288 | 3.9 |
| Triton CF-10 | 1.0 |
| Dispelair CF-246 | 1.0 |
| Natrosol 250 HBR | 5.0 |
| AMP-95 | 0.5 |
| Ti-Pure R-706 | 38.5 |
| CC-700 | 156.0 |
| CC-1000 | 112.0 |
| ASP 170 | 97.0 |
| DB-80 | 58.5 |
| Letdown | |
| Latex 2 | 76.3 |
| Latex 6 | 40.6 |
| Texanol | 6.3 |
| Dispelair CF-246 | 0.3 |
| Water | 26.0 |
| Total | 1000.00 |
| Paint characteristics | |
| PVC | 75% |
| VS | 32% |

IV. Results of Viscosity Stability of Aqueous Coating Compositions (Paint 1 to 2, 5 to 8, and 11 to 15)

TABLE 20

| Paint No. s | PVC of the coating composition | Stormer Viscosity, KU$^f$ | | Heat Age Viscosity, KU$^g$ | | Delta KU$^h$ |
|---|---|---|---|---|---|---|
| | | Initiate | Equilibrated | Initiate | Equilibrated | |
| 1 | 35% | 80 | 84 | 84 | 88 | 4 |
| 2$^i$ | 35% | 98 | 107 | 110 | >140 | >30 |
| 5 | 35% | 105 | 109 | 110 | 100 | −10 |
| 6$^i$ | 35% | 109 | 116 | 118 | >140 | >22 |
| 7 | 75% | 100 | 108 | 109 | 105 | −4 |
| 8$^i$ | 75% | 104 | 114 | 120 | >140 | >20 |
| 11$^i$ | 75% | 102 | 113 | 117 | 126 | 9 |
| 12 | 75% | 104 | 106 | 106 | 96 | −10 |
| 13$^i$ | 75% | 105 | 107 | 109 | >140 | >31 |
| 14 | 75% | 105 | 114 | 116 | 125 | 9 |
| 15$^i$ | 75% | 112 | 123 | 124 | >140 | >16 |

$^f$Stormer Viscosity was measured in 500 ml can;
$^g$Heat Age Viscosity was measured in 200 ml can;
$^h$Delta KU is the KU changes after heat age;
$^i$Paint 2, 6, 8, 11, 13 or 15 is comparative example with non-encapsulated TiO$_2$ in the dispersions; the compositions of it are listed above.

As shown in Table 20, data indicates that aqueous dispersions of polymer encapsulated pigment can help to improve the paint viscosity stability of coating compositions containing polymerized ethylenically unsaturated phosphorus or phosphorus salts containing monomer, or itaconic acid, with or without additional polar monomers. As shown in Table 20, the KU changes after heat-age is within 10 when aqueous dispersion of polymer encapsulated pigment exists. While in comparative paints where pigments were not encapsulated, the KU after heat-age has exceeded 140 and the KU changes are over 20. Base on the discussion above, in the formulations comprising containing polymerized ethylenically unsaturated phosphorus or phosphorus salts containing monomer, or itaconic acid, aqueous dispersions of polymer encapsulated pigment can improve paint stability. Comparing paint 11 with paint 7, paint viscosity still increased significantly when TiO$_2$ was replaced with an extender. Therefore, paint viscosity increase is not only attributable to the interaction between TiO$_2$ and latex containing polymerized ethylenically unsaturated phosphorus or phosphorus salts containing monomer, or itaconic acid, the extenders appear to also cause viscosity instability with this. Based on the results, the encapsulated TiO$_2$ has unexpected synergy to improve the viscosity stability of the coating compositions containing latex with polymerized ethylenically unsaturated phosphorus or phosphorus salts containing monomer, or itaconic acid.

V. Results of Stain Resistance

TABLE 21

| Paint Number | PVC of the coating composition | Stain resistance |
|---|---|---|
| 1 | 35% | 83 |
| 2$^i$ | 35% | 76 |
| 3$^i$ | 35% | 80 |
| 4$^i$ | 35% | 58 |

$^i$Paint 2, 3, or 4 is comparative example.

As shown in Table 21, the latex containing polymerized ethylenically unsaturated phosphorus or phosphorus salts containing monomer, or itaconic acid can help to improve stain resistance than non-phosphorus or phosphorus salts containing monomer or non-itaconic acid latex, for example, comparing paint 4 with paint 2, and comparing paint 3 vs paint 1. That is the benefit to add latex containing polymerized ethylenically unsaturated phosphorus or phosphorus salts containing monomer, or itaconic acid into paint composition. However, latex containing polymerized ethylenically unsaturated phosphorus or phosphorus salts containing monomer, or itaconic acid in paint composition would cause viscosity stability issue. In our invention, it has been improved by aqueous dispersions of polymer encapsulated pigment (comparing paint 2 with paint 1). Comparing paint 4 with paint 1, stain resistance has been improved significantly without any compromising in paint stability if add latex containing polymerized ethylenically unsaturated phosphorus or phosphorus salts containing monomer, or itaconic acid into paint composition which contains polymer encapsulated pigment.

VI. Results of Washability

TABLE 22

| Paint Number | PVC of the coating composition | Washability |
|---|---|---|
| 7 | 75% | 336 |
| 8$^i$ | 75% | 413 |
| 9 | 75% | 226 |
| 10$^i$ | 75% | 291 |

$^i$Paint 8, or 10 is comparative example.

As shown in Table 22, the latex containing polymerized ethylenically unsaturated phosphorus or phosphorus salts containing monomer, or itaconic acid can help to improve scrub resistance than latex without these special monomer in high PVC paint formulation, for example, comparing paint 10 with paint 8, and comparing paint 9 with paint 7. That is the benefit to add latex containing polymerized ethylenically unsaturated phosphorus or phosphorus salts containing monomer, or itaconic acid into paint composition. However, latex containing polymerized ethylenically unsaturated phosphorus or phosphorus salts containing monomer, or itaconic acid in paint composition would cause viscosity stability issue in normal pigment formulation. In our invention, it has been improved by polymer encapsulated pigment (comparing paint 8 with paint 7). Comparing paint 10 with paint 7, washability has been improved significantly without any compromising in paint stability if add latex containing polymerized ethylenically unsaturated phosphorus or phosphorus salts containing monomer, or itaconic acid into paint composition which contains polymer encapsulated pigment.

The invention claimed is:

1. An aqueous coating composition with a pigment volume concentration (PVC) of from 65% to 85% comprising:
    i) from 5% to 60%, by weight based on the total weight of the aqueous coating composition, of an aqueous copolymer dispersion comprising, in percentage by dry weight based on the dry weight of the copolymer dispersion:

(a) 90% to 99.95% at least one ethylenically unsaturated nonionic monomer; and
(b) 0.05% to 10% at least one ethylenically unsaturated phosphorus or phosphorus salts containing monomer, copolymerized itaconic acid, or the mixture thereof; and ii) from 1% to 50%, by volume based on the total volume of the aqueous coating composition, of a pigment composition comprising from 50% to 100%, by dry volume based on the total dry volume of the pigment composition, of a polymer encapsulated pigment.

2. The aqueous coating composition according to claim 1 wherein the aqueous copolymer dispersion further comprises in percentage by dry weight based on the dry weight of the copolymer dispersion, of (c) 0.05% to 3% at least one polar monomer.

3. The aqueous coating composition according to claim 1 wherein the monomer (b) is phosphoalkyl (meth)acrylates, phosphoalkoxy (meth)acrylates, salts thereof, or itaconic acid.

4. The aqueous coating composition according to claim 1, wherein the polymer shell of the said polymer encapsulated pigment is comprised of at least one copolymerized ethylenically unsaturated nonionic monomer.

5. The aqueous coating composition according to claim 1, wherein the KU changes of the aqueous coating composition before and after conditioning a sample of the aqueous coating composition in a 200 mL can for ten days in a 50° C. oven is from −10 to 9.

6. The aqueous coating composition according to claim 1, wherein the polymer shell of the polymer encapsulated pigment has an average thickness of 10 nanometers to 200 nanometers; or the polymer shell of the polymer encapsulated pigment has a minimum film formation temperature (MFFT) from −35° C. to 60° C.

7. The aqueous coating composition according to claim 6, wherein the polymer shell of the polymer encapsulated pigment comprises, in percentage by weight based on the dry weight of the said polymer shell, from 0.1% to 10% of an ethylenically unsaturated monomer carrying at least one functional group selected from carboxyl, carboxylic anhydride, hydroxyl, amide, amine, sulphonate, phosphonate and mixtures thereof.

8. The aqueous coating composition according to claim 6, the polymer shell of the polymer encapsulated pigment comprises further, in percentage by weight based on the dry weight of the said polymer shell, from 0.1% to 5% of at least one surfactant.

9. The aqueous coating composition according to claim 1, wherein the pigment in the polymer encapsulated pigment particle is $TiO_2$.

10. The aqueous coating composition according to claim 9, wherein the $TiO_2$ in the polymer encapsulated $TiO_2$ has a volume percent to the total $TiO_2$ in the aqueous coating composition of from 50% to 100%, and the volume concentration of total $TiO_2$ in the aqueous coating composition is from 2% to 30%.

* * * * *

UNITED STATES PATENT AND TRADEMARK OFFICE
CERTIFICATE OF CORRECTION

PATENT NO. : 9,816,002 B2  
APPLICATION NO. : 14/426835  
DATED : November 14, 2017  
INVENTOR(S) : Tao Wang et al.

Page 1 of 1

It is certified that error appears in the above-identified patent and that said Letters Patent is hereby corrected as shown below:

On the Title Page

Item (72) for the Inventor Tao Wang, "Highton (AU)" should read:  
--Shanghai (CN)--.

Signed and Sealed this  
Twenty-second Day of May, 2018

Andrei Iancu  
*Director of the United States Patent and Trademark Office*